United States Patent
Ono et al.

(10) Patent No.: US 7,755,865 B2
(45) Date of Patent: *Jul. 13, 2010

(54) VIBRATION REDUCING HEAD SUSPENSION MECHANISM FOR A MAGNETIC DISC UNIT

(75) Inventors: Kyosuke Ono, Tokyo (JP); Hirotaka Shinada, Tokyo (JP)

(73) Assignee: Jun Naruse, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/550,707

(22) Filed: Aug. 31, 2009

(65) Prior Publication Data

US 2009/0316305 A1 Dec. 24, 2009

Related U.S. Application Data

(63) Continuation of application No. 11/151,525, filed on Jun. 14, 2005, now Pat. No. 7,606,001.

(30) Foreign Application Priority Data

Dec. 14, 2004 (JP) ............................. 2004-361371

(51) Int. Cl.
G11B 5/48 (2006.01)
G11B 21/16 (2006.01)
(52) U.S. Cl. .................. 360/245; 360/245.3; 360/245.7
(58) Field of Classification Search ................. 360/245, 360/245.3, 245.5, 245.7, 245.9

See application file for complete search history.

(56) References Cited

U.S. PATENT DOCUMENTS

| 4,447,493 A | 5/1984 | Driscoll et al. |
| 5,367,419 A | 11/1994 | Kazama |
| 5,461,525 A | 10/1995 | Christianson et al. |
| 5,526,205 A | 6/1996 | Aoyagi et al. |
| 5,570,249 A | 10/1996 | Aoyagi et al. |
| 5,719,727 A | 2/1998 | Budde |
| 5,771,136 A | 6/1998 | Girard |
| 5,796,553 A | 8/1998 | Tangren |
| 5,936,804 A | 8/1999 | Riener et al. |
| 5,949,617 A | 9/1999 | Zhu |
| 5,991,122 A | 11/1999 | Tangren et al. |

(Continued)

FOREIGN PATENT DOCUMENTS

JP 01-248372 10/1989

OTHER PUBLICATIONS

Mechanical Engineering Congress, 2004 Japan (MECJ-04) URL: http://www.jsme.or.jp/.

(Continued)

*Primary Examiner*—Brian E Miller
(74) *Attorney, Agent, or Firm*—Young & Thompson

(57) ABSTRACT

There is provided a head suspension mechanism capable of more effectively restraining sway mode and second-order torsion mode vibrations of the head suspension mechanism caused by an air flow. A flange portion having a free end portion 23c on the base part side is formed at both edges close to the tip end of a suspension main frame 23, and at the same time, an elastic material 23d is provided in the free end portion 23c. Also, a sway mode dynamic vibration absorber is formed by the length of the flange portion and the damping effect of the elastic material 23d.

1 Claim, 15 Drawing Sheets

U.S. PATENT DOCUMENTS

| | | | |
|---|---|---|---|
| 6,115,220 A | 9/2000 | Khan et al. | |
| 6,201,664 B1 | 3/2001 | Le et al. | |
| 6,341,050 B1 | 1/2002 | Coon et al. | |
| 6,445,546 B1 | 9/2002 | Coon et al. | |
| 6,504,684 B1 | 1/2003 | Danielson et al. | |
| 6,556,382 B1 | 4/2003 | Tangren | |
| 6,633,456 B1 | 10/2003 | Tsuchida et al. | |
| 6,667,856 B2 | 12/2003 | Danielson et al. | |
| 6,885,523 B1 | 4/2005 | Summers et al. | |
| 6,967,821 B2 | 11/2005 | Himes et al. | |
| 7,245,456 B2 | 7/2007 | Hashi et al. | |
| 7,606,001 B2 * | 10/2009 | Ono et al. | 360/245 |
| 2001/0030837 A1 | 10/2001 | Murphy et al. | |
| 2003/0058579 A1 | 3/2003 | Danielson et al. | |
| 2004/0070883 A1 | 4/2004 | Mahoney et al. | |
| 2004/0130825 A1 | 7/2004 | Danielson et al. | |
| 2005/0157428 A1 | 7/2005 | Choi | |
| 2006/0176617 A1 | 8/2006 | Kido et al. | |
| 2006/0227464 A1 | 10/2006 | Huang et al. | |

OTHER PUBLICATIONS

Information Storage and Processing Systems Conference 2004, Jun. 14-16, 2004 Santa Clara University.

* cited by examiner

VIBRATION REDUCING HEAD SUSPENSION MECHANISM FOR A MAGNETIC DISC UNIT

This application is a continuation of co-pending application Ser. No. 11/151,525, filed on Jun. 14, 2005. The entire contents are hereby incorporated by reference.

BACKGROUND OF THE INVENTION

1. Field of the Invention

The present invention relates to a head suspension mechanism which is used for a magnetic disc unit such as a hard disc mounted on a personal computer and elastically supports a head slider to perform recording and regenerating to a magnetic disc. More particularly, it relates to a head suspension mechanism with a dynamic vibration absorber, which is capable of restraining vibrations caused by an air flow generating due to the high-speed rotation of the magnetic disc, especially sway mode vibrations and second-order torsion mode vibrations that result in a positional shift between a head and a recording track.

2. Description of the Related Art

A personal computer and the like have conventionally used a magnetic disc unit as a recording/regenerating medium for information.

FIG. 12 is a plan view showing one example of a general magnetic disc unit. As shown in FIG. 12, the magnetic disc unit D is configured so that a magnetic disc body d capable of rotating at a high speed is held in a housing B consisting of a lid-shaped mating structure (only one is shown), and a head arm HA, which is capable of being rotated in a substantially radial direction (refer to an arrow mark) of the magnetic disc body d by the drive of a voice coil motor (VCM) M, is provided so as to face to the magnetic disc body d. Also, in a free end part of the head arm HA, there is provided a head slider suspension HS that holds a head slider (not shown) for performing writing of data to the magnetic disc body d and reading of the written data.

In recent years, the capacity and speed of the magnetic disc body d have increased. Accordingly, the head slider suspension HS is required to have vibration damping properties so as to prevent the occurrence of vibrations of head caused by an air flow (turbulent flow) generating when the magnetic disc body d rotates.

FIG. 13 is a perspective view of a head suspension, showing one example of a conventional head suspension mechanism. This head suspension 1 includes a fixed plate 2 stakingly connected to the aforementioned head arm HA, a suspension main frame 3 consisting of a thin metal sheet fixed to the fixed plate 2, a flexure 4 fixed at the tip end of the suspension main frame 3, and a head slider 5 fixed on the bottom surface at the tip end of the flexure 4.

In a base part of the suspension main frame 3, a leg portion 3a is formed so as to provide flexural elasticity by blanking a central part thereof. Also, at both edges of the suspension main frame 3, flange portions 3b erecting along the edges are formed.

In the flexure 4, a substantially U-shaped slit 4a is formed so as to surround a central part thereof, so that by elastically fixing the head slider 5, a load from the suspension main frame 3 is applied to a central part of the back surface (fixed surface) of the head slider 5.

Since the configuration is as described above, the head suspension mechanism supports the head slider 5 for performing recording/regenerating on the surface of the magnetic disc body d rigidly in the in-plane direction (horizontal direction=XY direction) and flexibly in the out-of-plane direction (vertical direction=Z direction), and also can perform a function of giving a fixed load force to the head slider 5.

Also, since the head suspension mechanism is moved in the in-plane direction at a high speed to move the head slider 5 to a recording track of the magnetic disc body d at a high speed, it is important that the suspension mechanism be as light in weight as possible and moreover be not subjected to vibrations as an elastic body.

For this reason, as shown in FIG. 13, the suspension main frame 3 is formed into a tapered triangular shape by using a stainless steel material with a thickness of several tens of micrometers, and the flange portions 3b erecting vertically are formed at both edges of the suspension main frame 3, by which the suspension main frame 3 itself is configured so as to be light in weight and have high flexural rigidity. The flexible flexural elasticity function of the head suspension mechanism is provided in the leg portion 3a for fixing the suspension main frame 3 to the fixed plate 2.

Since the head slider 5 is fixed to the flexure 4, the head slider 5 is supported flexibly not only in the out-of-plane direction but also the pitching direction and the rolling direction so as to follow the vibrations and swell of the magnetic disc surface by means of air film rigidity.

FIG. 14 is a perspective view of a head suspension, showing another example of the conventional head suspension mechanism. In this head suspension, the thickness of the suspension main frame 13 is increased as a whole, by which the flange portions 3b of the suspension main frame 3 are eliminated. In FIG. 14, the same reference characters are applied to elements that are substantially the same as those in FIG. 13, and the explanation thereof is omitted.

In recent years, the density of track recorded on the magnetic disc surface has been becoming high. Accordingly, an air flow around the suspension, which is generated by the rotation of the magnetic disc body d, induces minute elastic vibrations on the order of nanometers, which becomes a main cause for a track positioning error of the head slider 5.

Such an elastic vibration has many components having a frequency higher than a servo band, and hence cannot be restrained by control, so that an excitation vibration itself must be reduced. Therefore, it is considered that as shown in FIG. 15, a restraining multilayer visco-elastic plate 6 is affixed to the upper surface of the suspension main frame 3 to provide damping.

This restraining multilayer visco-elastic plate 6 is formed into a multilayer structure in which the upper layer is a restraining metal plate 6a and the lower layer is a visco-elastic material 6b, and has a construction such that the visco-elastic material 6b is held between two metal plates of the suspension main frame 3 and the restraining metal plate 6a.

The restraining multilayer visco-elastic plate 6 produces a damping force by means of relative motion between the visco-elastic material 6b and the upper and lower metal plates, so that an effect of damping flexural vibrations of the suspension mechanism is great. However, the restraining multilayer visco-elastic plate 6 has a problem in that an effect of damping torsional vibrations and sway mode vibrations in which the tip end of suspension vibrates swingingly in a plane is little.

The sway mode vibration is a vibration of a mode in which the head slider 5 is vibrated in the track position shift direction (Y direction in FIG. 15), and is responsible for a shift of track of the head slider 5. Therefore, it is desirable to effectively damp the sway mode vibrations excited by an air flow.

The torsional vibrations can also be adjusted so as not to affect the track position sift and float clearance variation due to the first-order mode. However, the second-order torsion mode vibrations often produce a track shift.

Thereupon, it is considered that the sway mode and second-order torsion mode vibrations of the head suspension mechanism caused by an air flow are prevented (refer to U.S. Pat. No. 5,943,191).

FIG. 16 shows a head suspension showing an idea of applying a technique similar to the dynamic vibration absorber to the head suspension mechanism.

In the typical example shown in FIG. 16, a fixture 14 is provided with a mustache-shaped damping plate 14a, and a frictional force due to relative vibrations of a contact portion between the damping plate 14a and a contact plate 15 caused when the flexure 14 is going to vibrate is utilized.

Such measures are effective when the flexure 14 resonates greatly. However, the measures have a drawback in that no effect is achieved in the case of minute vibration in which the contact portion between the damping plate 14a and the contact plate 15 does not shift relatively.

SUMMARY OF THE INVENTION

The present invention has been made to solve the above problems, and accordingly an object thereof is to provide a head suspension mechanism capable of restraining, more effectively, sway mode and second-order torsion mode vibrations of the head suspension mechanism caused by an air flow.

To achieve the above object, an invention of a first aspect provides a head suspension mechanism which supports a head slider rigidly in the in-plane direction and softly in the out-of-plane direction, and is provided with a suspension main frame formed of an elastic cantilever thin sheet, which gives a load force to the slider, wherein a flange portion erecting substantially vertically is formed at both edges near a support portion of the head slider of the suspension main frame; a portion in which the flange portion and the suspension main frame are continuous is limited to the tip end portion of the suspension main frame located near the head slider and the remaining portion of the flange portion is made a free end portion; and a sway mode dynamic vibration absorber is formed by the length of the flange portion and the damping effect of an elastic material provided in the free end portion.

An invention of a second aspect provides a head suspension mechanism which supports a head slider rigidly in the in-plane direction and softly in the out-of-plane direction, and is provided with a suspension main frame formed of an elastic cantilever thin sheet, which gives a load force to the slider, wherein a pair of cut-and-raise shaped dual tongue-shaped elastic plates are provided at positions symmetrical with respect to a center axis in almost the same direction as the extension direction of the suspension main frame near an antinode of second-order torsion mode vibration on the base part side of the suspension main frame; and a second-order torsion mode dynamic vibration absorber is formed by the length of the dual tongue-shaped elastic plate and the damping effect of a damping material provided on the surface thereof.

An invention of a third aspect provides a head suspension mechanism which supports a head slider rigidly in the in-plane direction and softly in the out-of-plane direction, and is provided with a suspension main frame formed of an elastic cantilever thin sheet, which gives a load force to the slider, wherein a flange portion erecting substantially vertically is formed at both edges near a support portion of the head slider of the suspension main frame; a portion in which the flange portion and the suspension main frame are continuous is limited to the tip end portion of the suspension main frame located near the head slider and the remaining portion of the flange portion is made a free end portion; and a sway mode dynamic vibration absorber is formed by the length of the flange portion and the damping effect of an elastic material provided in the free end portion, and a pair of cut-and-raise shaped dual tongue-shaped elastic plates are provided at positions symmetrical with respect to a center axis in almost the same direction as the extension direction of the suspension main frame near an antinode of second-order torsion mode vibration on the base part side of the suspension main frame; and a second-order torsion mode dynamic vibration absorber is formed by the length of the dual tongue-shaped elastic plate and the damping effect of a damping material provided on the surface thereof.

An invention of a fourth aspect provides a head suspension mechanism in which a visco-elastic material is provided between the free end portion and the suspension main frame.

An invention of a fifth aspect provides a head suspension mechanism in which a visco-elastic material is provided between the dual tongue-shaped elastic plate and the suspension main frame.

An invention of a sixth aspect provides a head suspension mechanism in which a vibration damping plate material consisting of a visco-elastic material layer and a metal sheet material layer is provided on the surface of the suspension main frame.

According to the head suspension mechanism in accordance with the present invention, the flange portion having the free end portion on the base part side is formed at both edges close to the tip end of the suspension main frame, and at the same time, the elastic material is provided in the free end portion, and also, the sway mode dynamic vibration absorber is formed by the length of the flange portion and the damping effect of the elastic material. Therefore, sway mode vibrations of the head suspension mechanism caused by an air flow can be restrained more effectively.

Also, according to the head suspension mechanism in accordance with the present invention, the paired cut-and-raise shaped dual tongue-shaped elastic plates symmetrical with respect to the center axis are provided in locations close to the base part of the suspension main frame, and at the same time, the damping material is provided in the free end portion of the dual tongue-shaped elastic plate, and also, the second-order torsion mode dynamic vibration absorber is formed by the length of the dual tongue-shaped elastic plate and the damping effect of the damping material. Therefore, second-order torsion mode vibrations of the head suspension mechanism caused by an air flow can be restrained more effectively.

Further, the flange portion having the free end portion on the base part side is formed at both edges close to the tip end of the suspension main frame, and at the same time, the elastic material is provided in the free end portion, and also, the sway mode dynamic vibration absorber is formed by the length of the flange portion and the damping effect of the elastic material; and the paired cut-and-raise shaped dual tongue-shaped elastic plates symmetrical with respect to the center axis are provided in locations close to the base part of the suspension main frame, and at the same time, the damping material is provided in the free end portion of the dual tongue-shaped elastic plate, and also, the second-order torsion mode dynamic vibration absorber is formed by the length of the dual tongue-shaped elastic plate and the damping effect of the damping material. Therefore, sway mode vibrations and second-order torsion mode vibrations of the head suspension mechanism caused by an air flow can be restrained more effectively.

Also, the visco-elastic material is provided between the free end portion and the suspension main frame or between the dual tongue-shaped elastic plate and the suspension main frame. Therefore, an effect of restraining the sway mode vibrations and second-order torsion mode vibrations of the head suspension mechanism caused by an air flow can further be increased.

Also, the vibration damping plate material consisting of the visco-elastic material layer and the metal sheet material layer is provided on the surface of the suspension main frame. Therefore, an effect of restraining the sway mode vibrations and second-order torsion mode vibrations of the head suspension mechanism caused by an air flow can further be increased.

DETAILED DESCRIPTION OF THE PREFERRED EMBODIMENTS

A head suspension mechanism in accordance with the present invention will now be described with reference to the accompanying drawings.

First Embodiment

Figure 1:
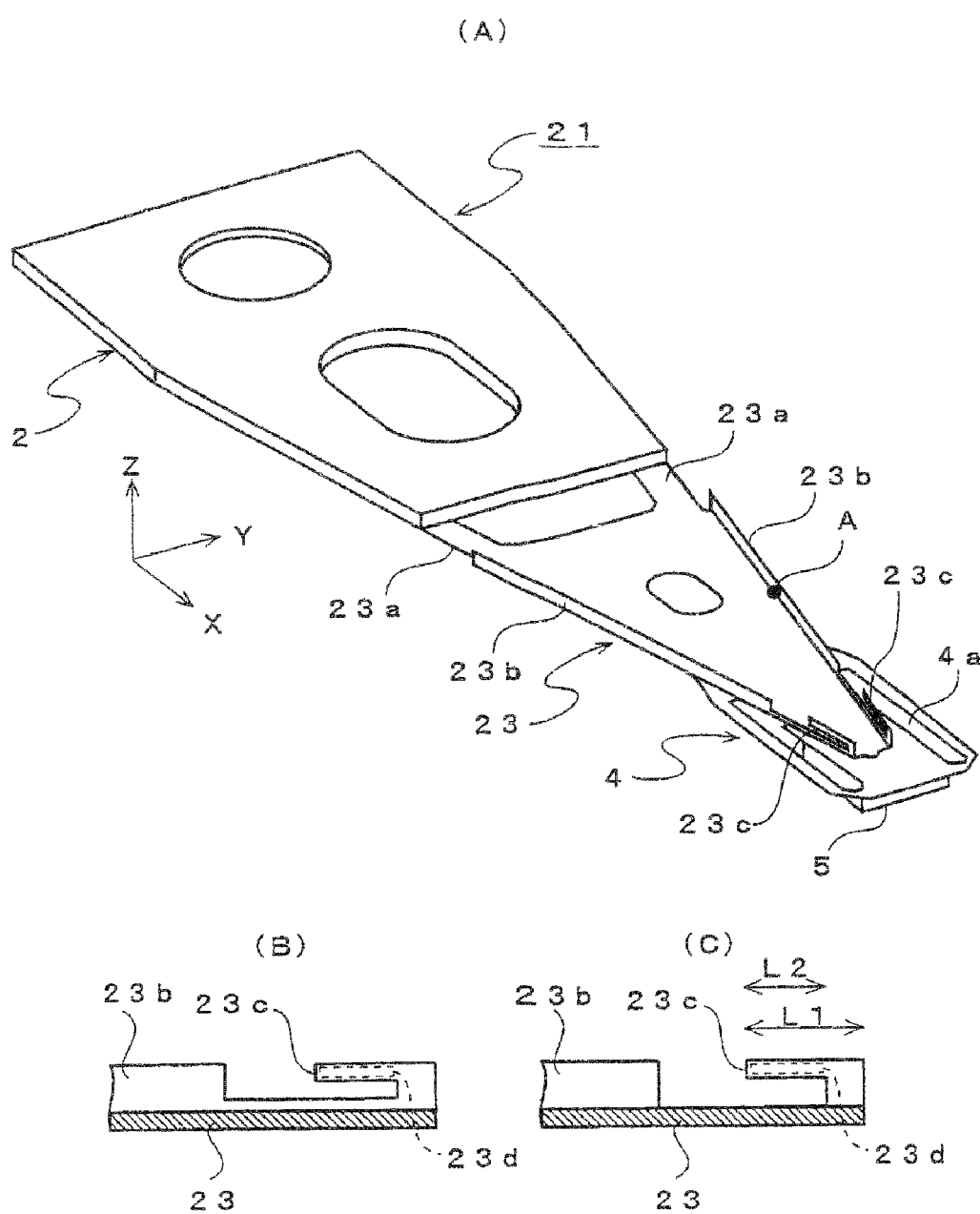
FIG. 1 is a view showing an embodiment of a head suspension mechanism with a dynamic vibration absorber for restraining sway mode vibrations in accordance with the present invention, FIG. 1(A) being a perspective view of a head suspension, FIG. 1(B) being an enlarged side view showing one example of a principal portion, and FIG. 1(C) being an enlarged side view showing another example of the principal portion.

FIG. 1 is a perspective view of a head suspension, showing a first embodiment of a head suspension mechanism in accordance with the present invention. In FIG. 1 and the following figures, the same reference characters are applied to elements that are substantially the same as those in the related art, and the explanation thereof is omitted.

A head suspension 21 in accordance with the present invention has a suspension main frame 23 formed of a thin metal sheet.

Figure 2:
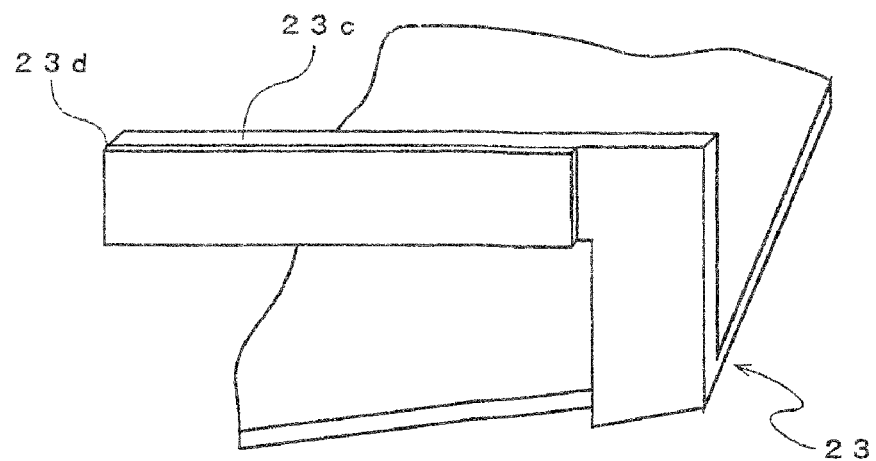
FIG. 2 is an enlarged view showing a construction and configuration of an L-shaped dynamic vibration absorber.

In a base part of the suspension main frame 23, a leg portion 23a is formed so as to provide flexural elasticity by blanking a central part thereof. Also, at both edges of the suspension main frame 23, flange portions 23b erecting along the edges are formed. Further, a free end portion 23c that is made free toward the base part side by cutting substantially into an L shape is formed in a location close to the tip end of the flange portion 23b. The free end portion 23c may have a configuration such that a rising portion ranging from the suspension main frame 23 to the flange portion 23b is left as shown in FIG. 1(B), or may have a configuration such as to be formed into a flange shape independent of the flange portion 23b without the rising portion ranging from the suspension main frame 23 to the flange portion 23b being left as shown in FIG. 1(C). A length L1 close to the tip end of the flange portion 23b including the free end portion 23c and a length L2 of the free end portion 23c are set according to sway mode vibrations generated by a rotational force etc. of a magnetic disc body d. At this time, the length L2 of the free end portion 23c is set more strictly than the length L1 close to the tip end of the flange portion 23b. On the other hand, on the outer surface side (or the inner surface side) of the free end portion 23c, a damping material 23d is provided as shown in FIG. 2.

Thereupon, the free end portion 23c formed integrally of the same material as that of the suspension main frame 23 and the damping material 23d affixed onto one-side surface of the free end portion 23c constitute a dynamic vibration absorber. The affixing region of the damping material 23d is determined so as to have a value such that the damping effect is optimal, and the damping material 23d can be affixed onto the inner surface of the free end portion 23c as necessary.

Figure 3:
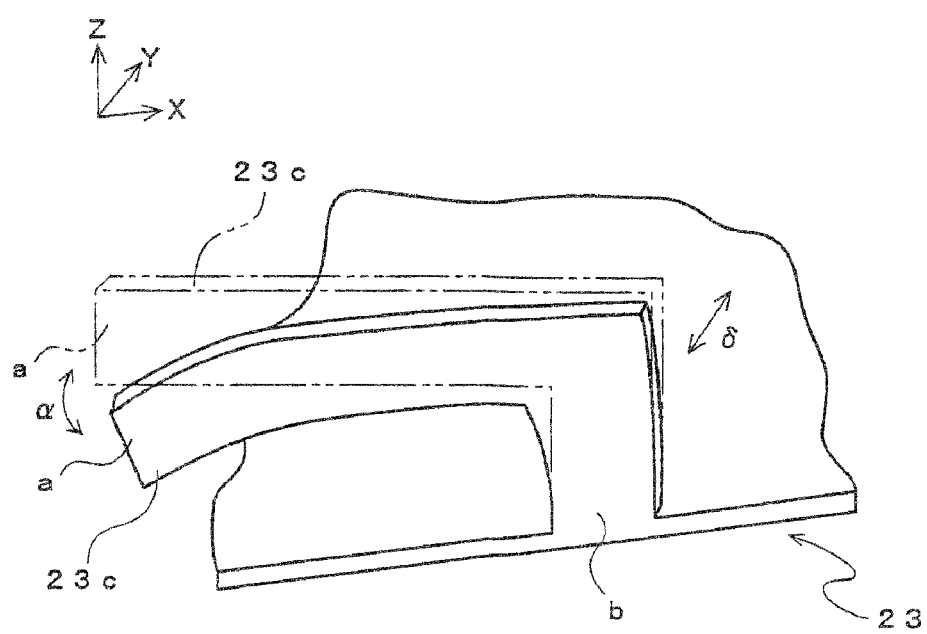
FIG. 3 is an enlarged view showing an operational function of an L-shaped dynamic vibration absorber.

FIG. 3 is a view more detailedly showing the vibration mode and construction when the free end portion 23c operates as a dynamic vibration absorber. In FIG. 3, the illustration of the damping material 23d shown in FIG. 2 is omitted.

The free end portion 23c consists of a beam part a and a connecting part b. The beam part a has a property of being subjected to flexural vibrations in the Y direction (the in-plane direction of the suspension main frame 23 or the track shift direction). Also, the connecting part b has a function of enhancing a spring effect of flexural vibration of the free end portion 23c. FIG. 3 shows the flexural vibration form of the beam part a when it functions as a dynamic vibration absorber and the deformation of the tip end of the connecting part b corresponding to the flexural vibration form. The suspension side of the connecting part b is integrally connected to the suspension main frame 23, so that it vibrates in the Y direction integrally with the suspension main frame 23 when the head suspension mechanism is subjected to sway mode vibrations in the Y direction. Therefore, as shown in FIG. 3, the displacement of the connecting portion between the connecting part b and the beam part a is a bending displacement $\delta$ in the Y direction, and a torsional angle $\alpha$ in the direction in which the beam part b is bent also contributes to the bending deformation.

Regarding the bending frequency of the free end portion 23c, the length L2 of the beam part a is especially important, and it is important to make design so that the first-order bending frequency approximately coincides with the sway mode frequency of the head suspension mechanism in accord with the theory of dynamic vibration absorber. Specifically, when viewing a frequency response characteristic of amplitude in the Y direction of the tip end of the head suspension mechanism by displacement vibrating the fixed part of the head suspension mechanism or by force vibrating the suspension main frame 23, the length L2 of the beam part a is determined so that two fixed points P and Q appearing near the sway mode resonance frequency have almost the same height. This is referred to as "the length L2 of the beam part a is determined so as to meet the coincidence condition in accord with the theory of dynamic vibration absorber".

After the length L2 of the beam part a is determined so as to meet the aforementioned coincidence condition, the free end portion 23c requires proper damping. To provide damping, various methods can be considered. A first method is to bond the damping material 23d on one surface or both surfaces of the free end portion 23c as shown in FIG. 2. As described later, the damping effect may be about $10^{-6}$ in terms of tan $\delta$ of material, and therefore a visco-elastic material has only to be bonded or applied.

Figure 4:
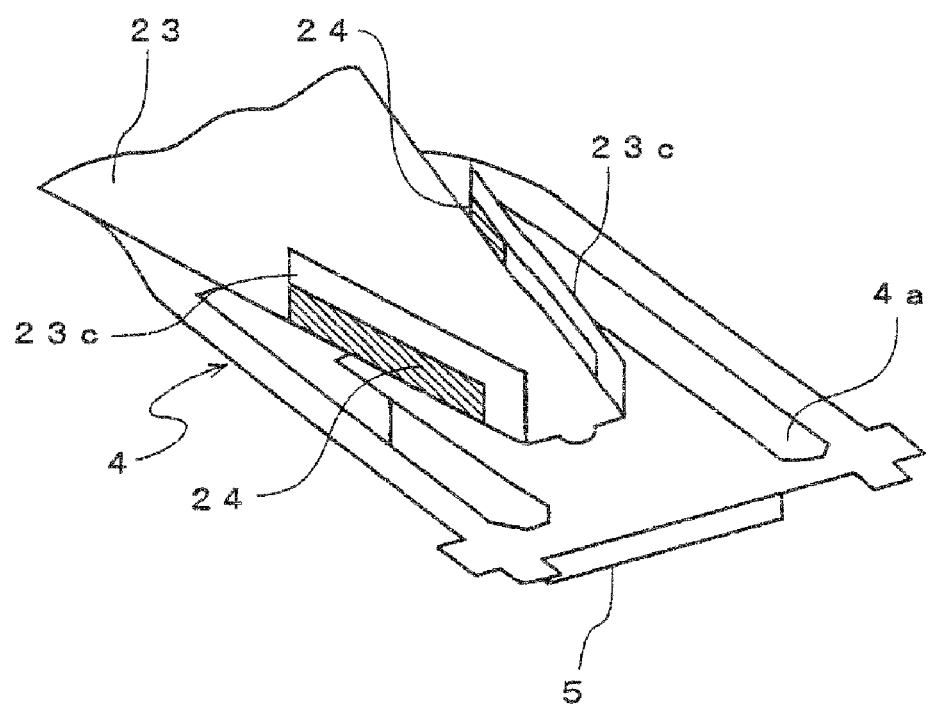
FIG. 4 is a perspective view of a head suspension, showing another embodiment of a head suspension mechanism with a dynamic vibration absorber for restraining sway mode vibrations in accordance with the present invention.

A second method for providing damping, as shown in FIG. 4, is to fill a visco-elastic material 24 in part or in whole of a separation clearance between the beam part a and the suspension main frame 23 to provide a damping effect. The filling region differs depending on the effect of the damping material 23d and the sway mode frequency, and thus the optimum amount must be determined experimentally according to the design conditions of head suspension mechanism and the properties of the visco-elastic material 24.

After the length L2 of the beam part a is determined so as to meet the aforementioned coincidence condition, the damping allowed to act on the beam part a has an optimum value. If the damping is too large, a resonance peak appears in a central part of two resonance frequencies. Inversely, if the damping is too small, the peaks of two resonance frequencies increase. Therefore, if the damping is determined so that the peaks of two resonance frequencies are in close proximity to the fixed points P and Q, the peaks near the two resonance frequencies with respect to the disturbance can be made at a minimum at the same time. Such an optimum condition of damping effect should be determined experimentally because the optimum condition depends on the method for providing damping and the damping material used. Herein, the method for providing damping is shown, and the fact that the optimum value can be determined experimentally is emphasized.

Second Embodiment

Figure 5:
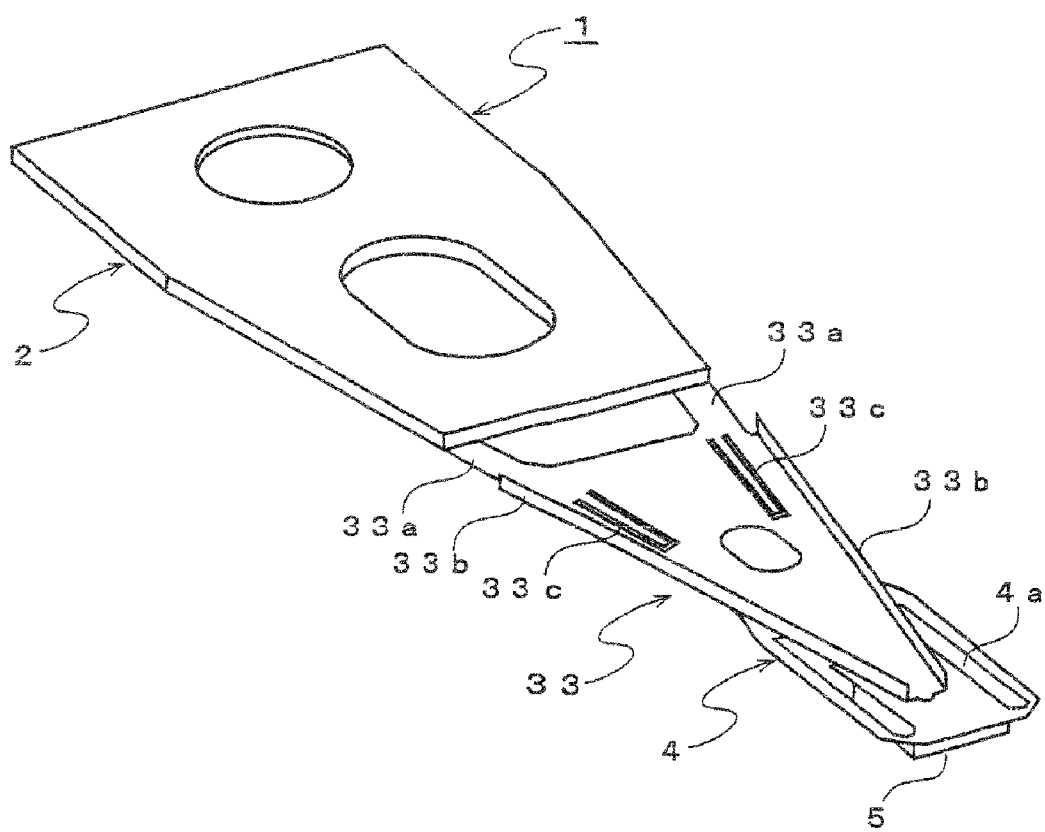
FIG. 5 is a perspective view of a head suspension, showing an embodiment of a head suspension mechanism with a dynamic vibration absorber for restraining second-order torsion mode vibrations in accordance with the present invention.

FIG. 5 is a perspective view of a head suspension, showing a second embodiment of a head suspension mechanism in accordance with the present invention. In the second embodiment, the aforementioned principle of dynamic vibration absorber is applied so that second-order torsion mode vibrations are damped efficiently. In FIG. 5 and the following figures, the same reference characters are applied to elements that are substantially the same as those in the related art, and the explanation thereof is omitted.

A head suspension 31 in accordance with the present invention has a suspension main frame 33 formed of a thin metal sheet.

In a base part of the suspension main frame 33, a leg portion 33a is formed so as to provide flexural elasticity by blanking a central part thereof. Also, at both edges of the suspension main frame 33, flange portions 33b erecting along the edges are formed. Further, a pair of dual tongue-shaped elastic plates 33c formed into a cut-and-raise shape symmetrically with respect to the center axis are formed as an additional vibration system for playing a role of dynamic vibration absorber in locations close to the base part of the suspension main frame 33. The root of the dual tongue-shaped elastic plate 33c is integrally connected to this suspension main frame 33. The location of this root corresponds to an antinode of second-order torsional vibration mode. Therefore, the dual tongue-shaped elastic plate 33c is vibrated most effectively by an intended second-order torsion mode vibrations. Both of the length of the dual tongue-shaped elastic plate 33c and the natural frequency of flexural vibration are determined so as to meet the condition coinciding with the second-order torsional vibration mode in accord with the theory of dynamic vibration absorber.

The dual tongue-shaped elastic plate 33c must also be provided with a damping effect. As a method for providing damping effect, there are available a method in which a damping material is bonded onto the upper surface (or upper and lower surfaces) of the dual tongue-shaped elastic plate 33c as in the method shown in FIG. 2 for the sway mode and a method in which a part or the whole of a clearance between the dual tongue-shaped elastic plate 33c and the suspension main frame 33 is filled with a visco-elastic material as in the method shown in FIG. 4. Since the damping effect has the optimum value as described above, the optimum value should be determined experimentally. The dual tongue-shaped elastic plate 33c is formed by blanking the surrounding portion thereof, and the forming method is almost the same as the existing cut-and-raise fabrication. In this case, however, the dual tongue-shaped elastic plate 33c is normally located in the same plane as the suspension main frame 33. Therefore, the term "cut-and-raise" in this case is used for convenience as a fabrication method, and actually the "raise" fabrication is not performed.

Third Embodiment

Figure 6:
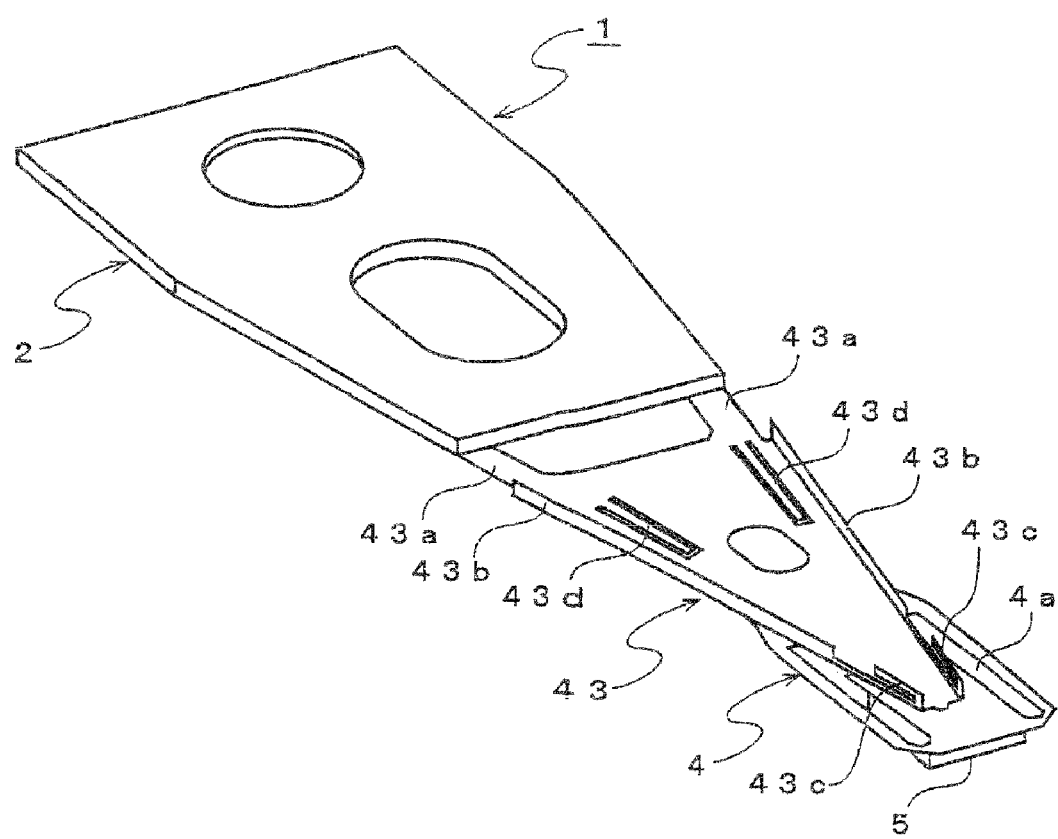
FIG. 6 is a perspective view of a head suspension, showing an embodiment of a head suspension mechanism with a dynamic vibration absorber, in which a plurality of dynamic vibration absorbers are installed to restrain sway mode and second-order torsion mode vibrations at the same time.

FIG. 6 is a perspective view of a head suspension, showing a third embodiment of a head suspension mechanism in accordance with the present invention. The third embodiment is configured so that the sway mode and second-order torsion mode vibrations are damped at the same time by the same principle of dynamic vibration absorber.

In FIG. 6, in a base part of a suspension main frame 43, a leg portion 43a is formed so as to provide flexural elasticity by blanking a central part thereof. Also, at both edges of the suspension main frame 43, flange portions 43b erecting along the edges are formed. Further, a free end portion 43c that is made free toward the base part side by cutting substantially into an L shape is formed in a location close to the tip end of the flange portion 43b. Also, a pair of dual tongue-shaped elastic plates 43d formed into a cut-and-raise shape symmetrically with respect to the center axis are formed as an additional vibration system for playing a role of dynamic vibration absorber in locations close to the base part of the suspension main frame 43. The free end portion 43c is substantially the same as the free end portion 23c, and the dual tongue-shaped elastic plate 43d is substantially the same as the dual tongue-shaped elastic plate 33c.

Thereupon, the free end portion 43c is the additional vibration system for playing a role of dynamic vibration absorber for damping the sway mode vibrations, and the dual tongue-shaped elastic plate 43d is the additional vibration system for playing a role of dynamic vibration absorber for damping the second-order torsion mode vibrations. These two structures each are the same as the above-described additional vibration systems, and both of the length of vibration plate and the natural frequency of flexural vibration are determined so as to meet the coincidence condition in accord with the theory of dynamic vibration absorber. In order to effectively damp the sway mode and second-order torsion mode vibrations at the same time, the additional vibration system for damping the second-order torsion mode vibrations is first determined, and then the additional vibration system for damping the sway mode vibrations is determined by the above-described method. By repeating this procedure, the final simultaneous coincidence condition is determined.

Thus, for the head suspension mechanism with a dynamic vibration absorber, which is configured by the free end portion 23c and the damping material 23d configured, for example, as shown in FIG. 1, the length L2 of the beam part a of the free end portion 23c is adjusted to make design so that the natural frequency of the flexural vibration is in proximity to the natural frequency of sway mode vibration of the head suspension mechanism, and the damping material 23d is designed so that the damping effect is optimal. Thereby, the vibration energy of sway mode is absorbed by the damping material 23d, and the resonance amplitude multiplying factor (Q value) can be reduced. Hereunder, the effect is explained by using a result of analysis of an actual suspension mechanism performed by the finite element method.

Figure 7:
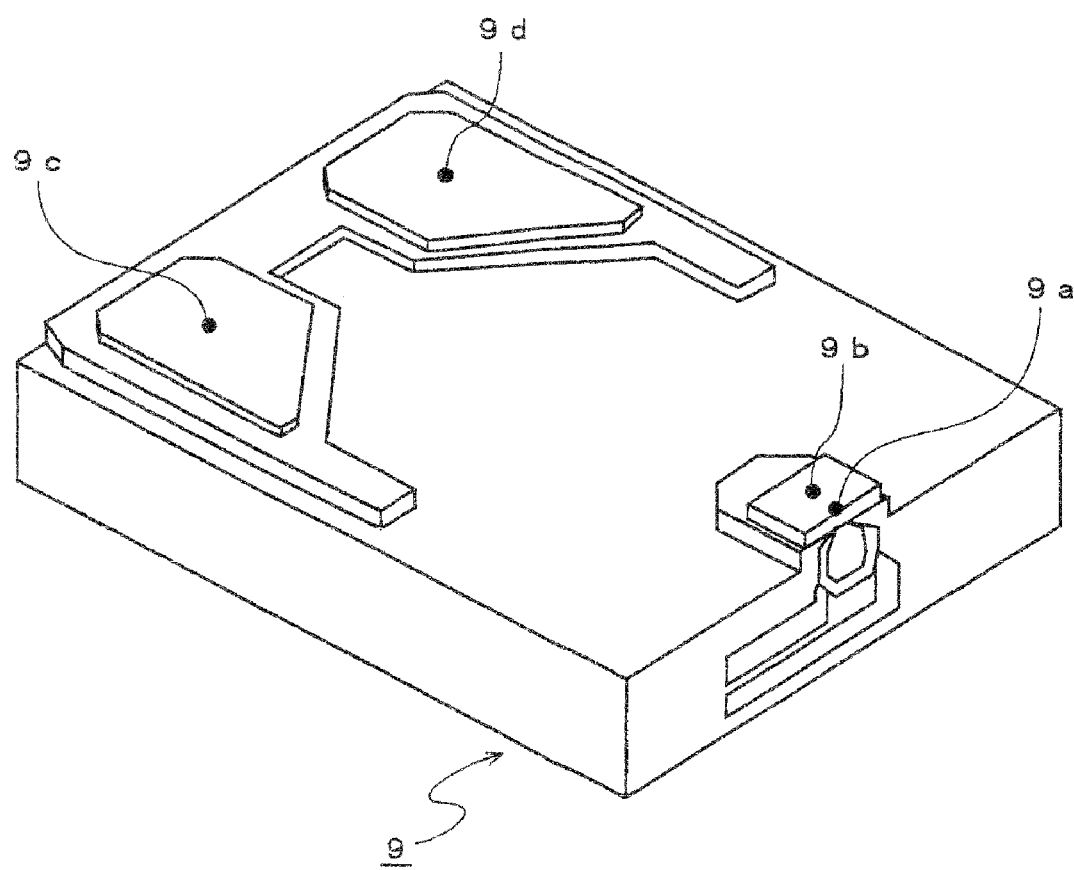
FIG. 7 is an enlarged view of a slider.
Figure 8:
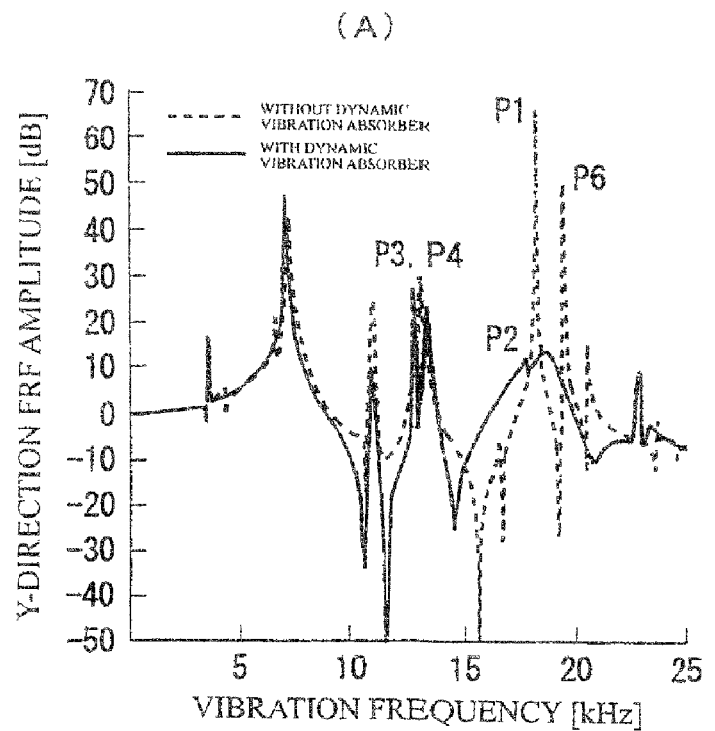
FIG. 8 is a graph of an amplitude characteristic of a compliance frequency response function in the Y direction (FIG. 8(A)) and in the Z direction (FIG. 8(B)) at a head position of a head suspension mechanism with a dynamic vibration absorber for damping sway mode resonance.
Figure 8:
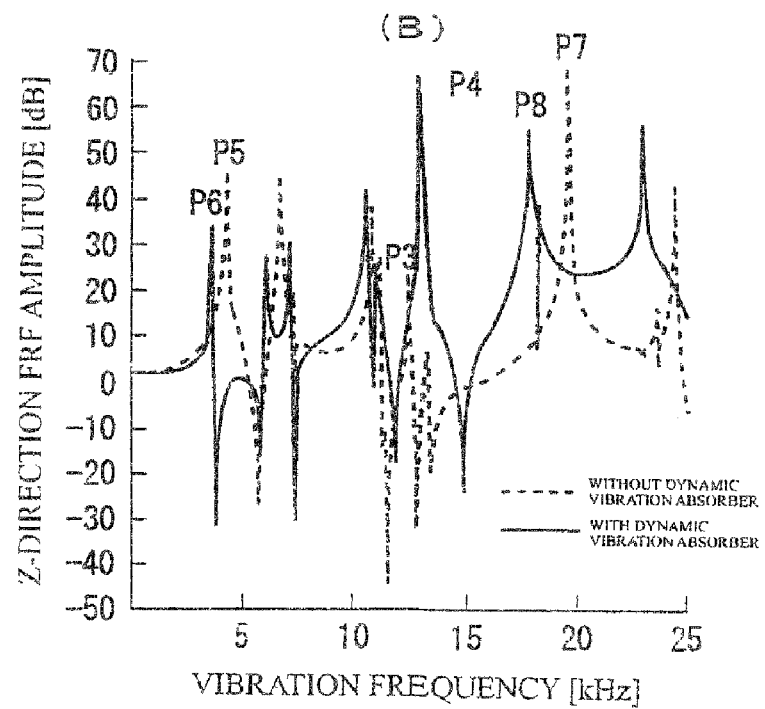

FIG. 8 is a graph showing an amplitude of a compliance frequency response function (FRF) of displacement amplitude in the Y and Z directions. The amplitude was observed at a head position 9a on a slider 9 shown in FIG. 7 at the time when a harmonic exciting force was applied in the Y and Z directions of point A of the suspension main frame 23 in the head suspension mechanism with a dynamic vibration absorber for damping the sway mode resonance shown in FIG. 1. This amplitude is called an FRF amplitude.

In this analysis, since the slider 9 simulates an actual floating state, the Z direction is supported by elastic springs at pad positions 9b, 9c and 9d. A solid line in the graph of FIG. 8 indicates an FRF in the case where the above-described coincidence condition is met and design is made so that damping is nearly optimal, and a broken line in the graph indicates an FRF in the case where the dynamic vibration absorber is not provided. In this case, a length from the fixed plate 2 of the suspension main frame 23 is 15.04 mm, and the thickness thereof is 38 µm. The thickness of the free end portion 23c of dynamic vibration absorber is 38 µm, the width of the beam part a is 0.3 mm, and the length that meets the coincidence condition is 1.20 mm. Also, the width of the connecting part is 0.3 mm. The optimum damping effect was $3\times10^{-6}$ in terms of equivalent tan δ value of Young's modulus of the beam part.

In the graph of FRF amplitude on the Y axis of FIG. 8, it is found that the highest-level frequency component P1 in the case where the dynamic vibration absorber is not provided, as indicated by the broken line, represents the sway mode, and the provision of the dynamic vibration absorber changes P1 to P2, decreasing the maximum value to 16 dB. The second-order torsion mode is represented by frequencies indicated by P3 and P4, and the FRF amplitude in the Y-axis direction is not changed by the provision of dynamic vibration absorber. However, the FRF amplitude in the Z direction is larger than the amplitude in the case where the dynamic vibration absorber is not provided. In FIG. 8, P5 and P6 represent the first-order bending mode, and P7 and P8 represent the third-order bending mode. In both modes, the natural frequency is decreased slightly by the provision of dynamic vibration absorber, but the peak amplitude is decreased in both of the Y direction and the Z direction.

As can be seen from the above description, in the head suspension mechanism with the L-shaped dynamic vibration absorber, the vibration amplitude in the Y direction in which a track shift occurs decreases, and the amplitude of sway mode, which poses the biggest problem, is decreased significantly, and is kept at 20 dB or lower. Therefore, the head suspension mechanism with the L-shaped dynamic vibration absorber shown in FIG. 1 has an advantage of being capable of damping sway mode vibrations generated by wind disturbance and hence enabling high track density recording.

Figure 9:
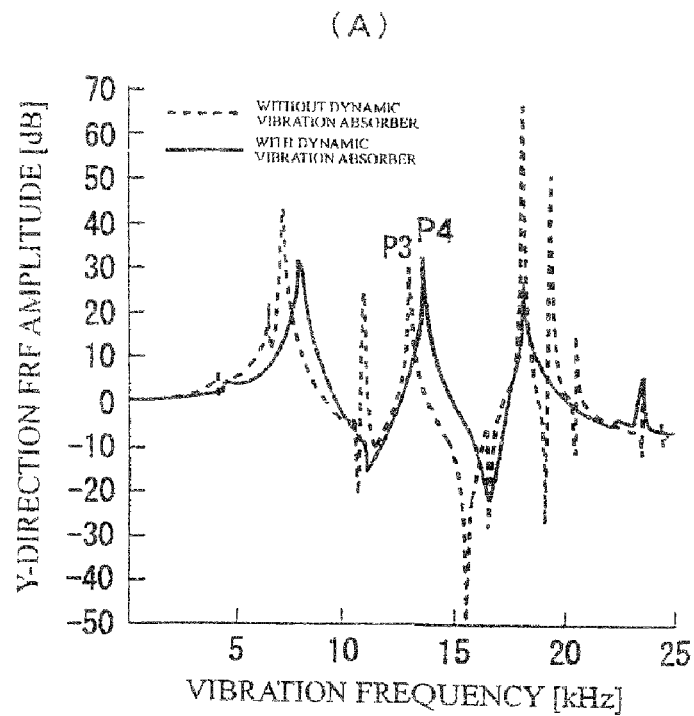
FIG. 9 is a graph of an amplitude characteristic of a compliance frequency response function in the Y direction (FIG. 9(A)) and in the Z direction (FIG. 9(B)) at a head position of a head suspension mechanism with a dynamic vibration absorber for damping second-order torsion mode resonance.
Figure 9:
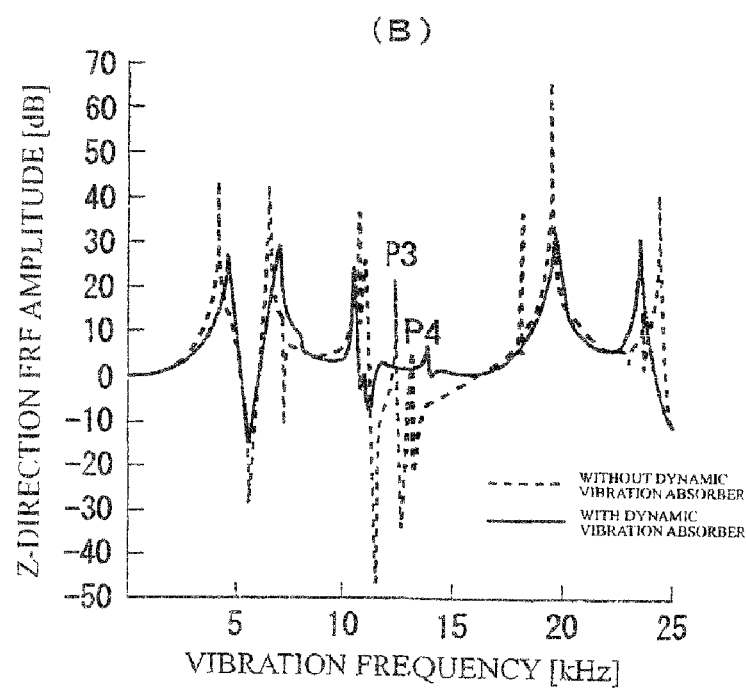

FIG. 9 is a graph showing the FRF amplitude of the head suspension mechanism with the dynamic vibration absorber, aiming at damping the second-order torsion mode vibrations, which is shown in FIG. 5. A solid line indicates the case where the dynamic vibration absorber is provided, and a broken line indicates the case where the dynamic vibration absorber is not provided. In this case, the dimensions of the suspension main frame are as described above, the width of the dual tongue-shaped elastic plate of dynamic vibration absorber is 0.2 mm, and the length that meets the coincidence condition of dual tongue-shaped elastic plate is 1.35 mm. Also, the optimum damping effect was $3\times10^{-6}$ in terms of equivalent tan δ value of Young's modulus of the beam part.

As can be seen from these figures, the peak amplitude P3 of the second-order torsion mode vibration without the dynamic vibration absorber in the Z direction is decreased to an amplitude P4 by the provision of the dynamic vibration absorber. This fact reveals that in the case where the second-order torsion mode vibrations, especially the vibrations in the Z direction, which pose a problem, the resonance amplitude can be decreased significantly by providing the dynamic vibration absorber having the construction as shown in FIG. 5.

Figure 10:
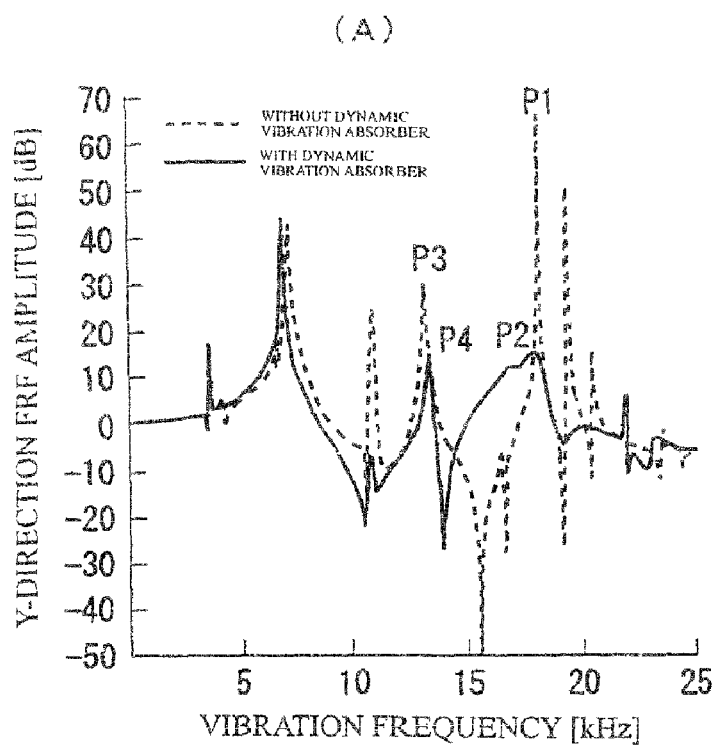
FIG. 10 is a graph of an amplitude characteristic of a compliance frequency response function in the Y direction (FIG. 10(A)) and in the Z direction (FIG. 10(B)) at a head position of a head suspension mechanism with a dynamic vibration absorber, in which two types of dynamic vibration absorbers are installed to damp sway mode and second-order torsion mode resonance.
Figure 10:
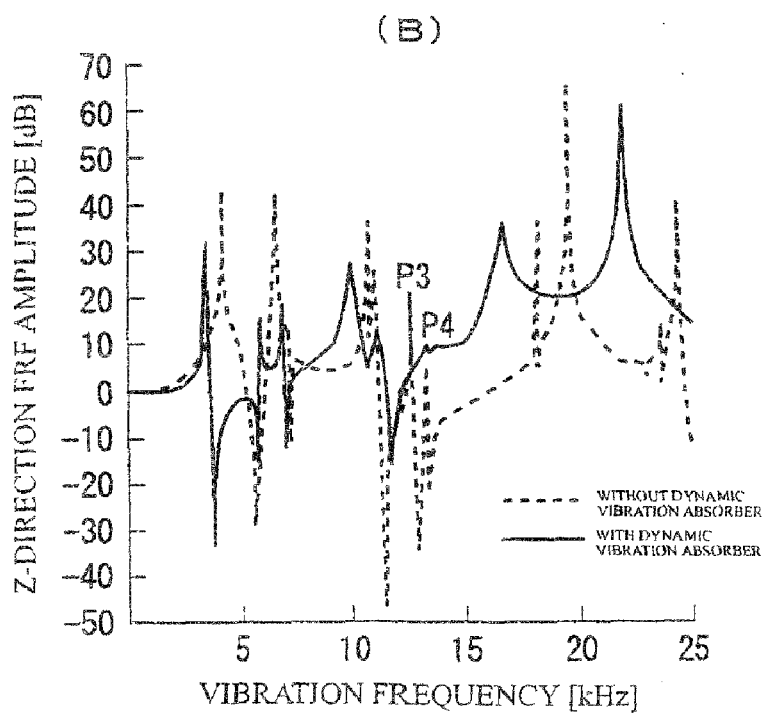

FIG. 10 is a graph showing the FRF amplitude of the head suspension mechanism provided with two dynamic vibration absorbers to damp the sway mode vibrations and the second-order torsion mode vibrations at the same time, which is shown in FIG. 6. A solid line indicates the case where the dynamic vibration absorber is provided, and a broken line indicates the case where the dynamic vibration absorber is not provided. In this case, the dimensions of the suspension main frame are as described above. The thickness of the free end portion 23c of the L-shaped dynamic vibration absorber aiming at damping the sway mode vibrations, the width of the beam part a, and the width of the connecting part were the same as described above, and the length of the beam part a, which met the coincidence condition, was 1.23 mm. On the other hand, the length of the dual tongue-shaped elastic plate 33c of dynamic vibration absorber aiming at damping the second-order torsion mode vibrations, which met the coincidence condition, was 1.41 mm. Also, the optimum damping effect was, as described above, $3 \times 10^{-6}$ in terms of equivalent tan δ value of Young's modulus of the beam part.

From these figures, it is found that the peak amplitude P1 of the sway mode vibration and the peak amplitude P3 of the second-order torsion mode vibration in the case where no dynamic vibration absorber is provided decrease to P2 and P4, respectively, by providing the dynamic vibration absorbers that meet the coincidence condition at the same time. Also, it is found that the maximum value of FRF amplitude in the Y direction of the sway mode vibration decreases to 14 dB. Further, it is found that in the second-order torsion mode, not only the amplitude in the Z direction can be decreased, but also the maximum value of amplitude in the Y direction can be decreased to 15 dB as compared with the case where the dynamic vibration absorber is provided to damp the second-order torsion mode vibrations only, as shown in FIG. 9.

As is apparent from the above description, the head suspension mechanism provided with the plurality of dynamic vibration absorbers aiming at damping both of the sway mode vibrations and the second-order torsion mode vibrations at the same time, which is shown in FIG. 6, decreases the sway mode vibrations that pose a problem of track shift and the vibrations in the Y direction due to the second-order torsion mode, and achieves a very great effect as compared with the construction provided with the dynamic vibration absorber aiming at damping the single mode vibrations. Therefore, it is preferable to design the head suspension mechanism provided with the plurality of dynamic vibration absorbers aiming at damping vibrations of a plurality of modes as shown in FIG. 6.

As can be seen from the above description, the dynamic vibration absorber having the free end portion 23c having the fixed part near the tip end of the head suspension mechanism has a characteristic of efficiently performing the function of additional vibration system for restraining the vibrations in the track shift direction of the head suspension mechanism, so that an efficient dynamic vibration absorber effect can be achieved by a little additional mass. Also, the free end portion 23c has the same thickness as that of the suspension main frame 23, and thus can be produced integrally from the same metal sheet material, so that the manufacturing cost is low.

The paired dual tongue-shaped elastic plate having the fixed part at the antinode of torsion mode of the head suspension mechanism has a characteristic of efficiently performing a function of additional vibration system restraining vibrations in the out-of-plane direction of torsion mode in the head suspension mechanism. Also, the additional mass is little, and hence an efficient dynamic vibration absorber effect can be achieved. The dual tongue-shaped elastic plate has a characteristic of being manufactured at a low cost because it can be prepared merely by cutting the suspension main frame partially into a U shape.

Furthermore, by combining the above-described two design plans, a dynamic vibration absorber effect can be achieved which is greater than the sum of effects at the time of design aiming at damping a single mode only. Actually, a design is effective in which a plurality of dynamic vibration absorbers aiming at damping vibrations of many modes are provided.

Figure 11:
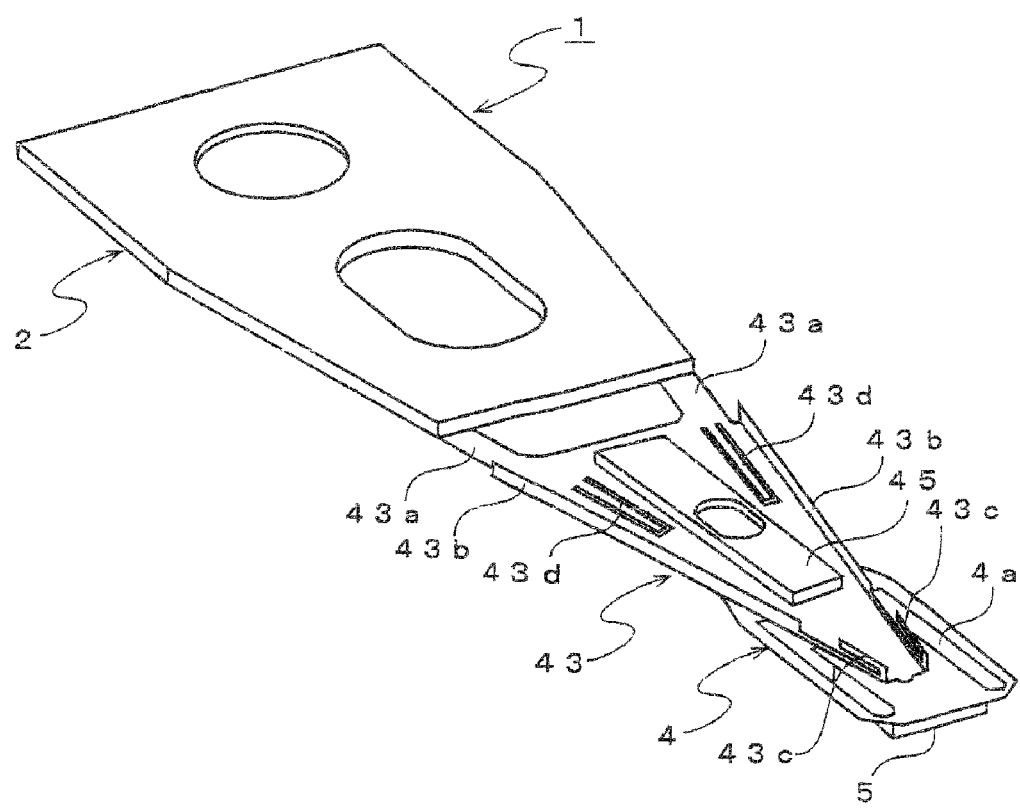
FIG. 11 is a perspective view of a head suspension, showing an example in which a restraining multilayer visco-elastic material is affixed to the embodiment of the present invention shown in FIG. 6.
Figure 12:
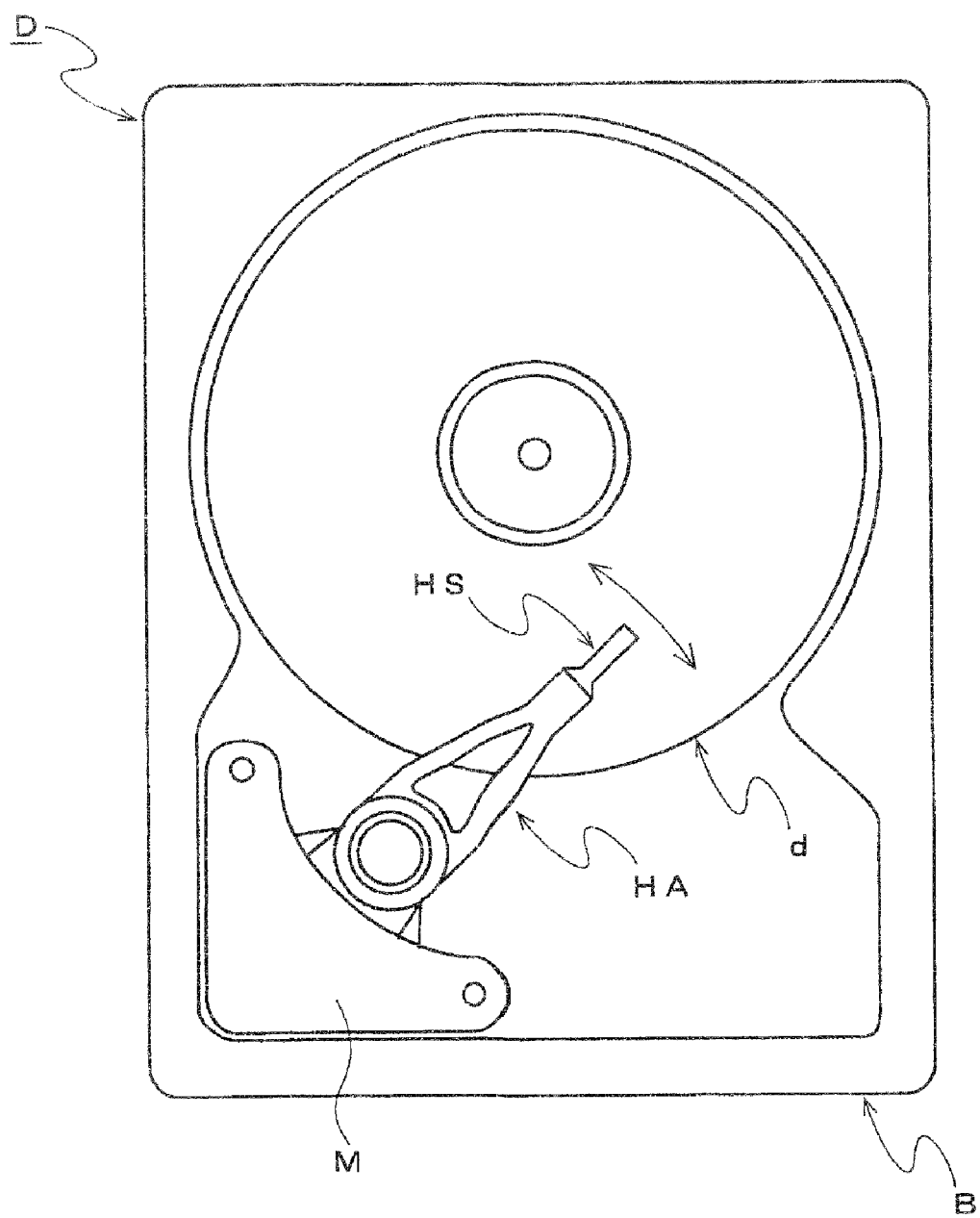
FIG. 12 is a plan view of a hard disc unit.
Figure 13:
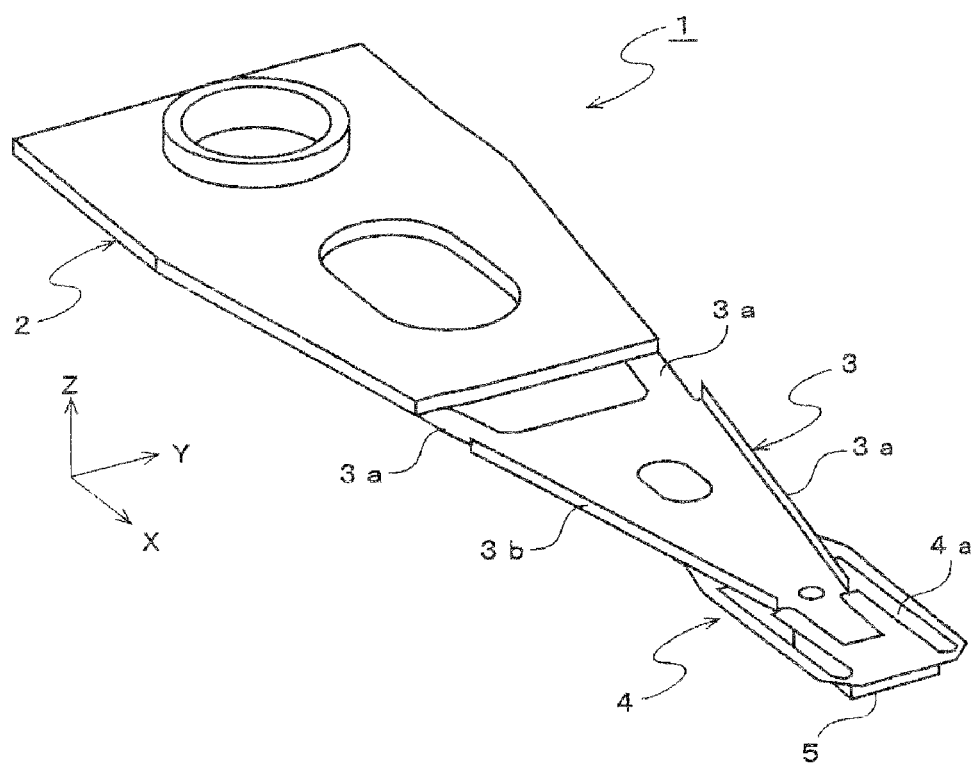
FIG. 13 is a perspective view of a head suspension, showing an example of a conventional head suspension mechanism.
Figure 14:
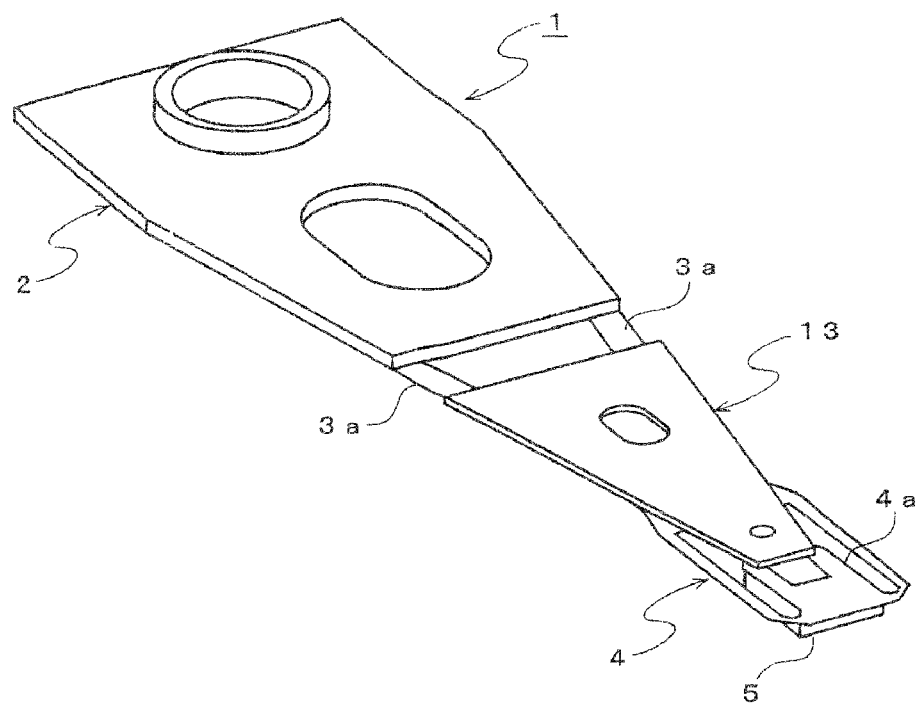
FIG. 14 is a perspective view of a head suspension, showing another example of a conventional head suspension mechanism.
Figure 15:
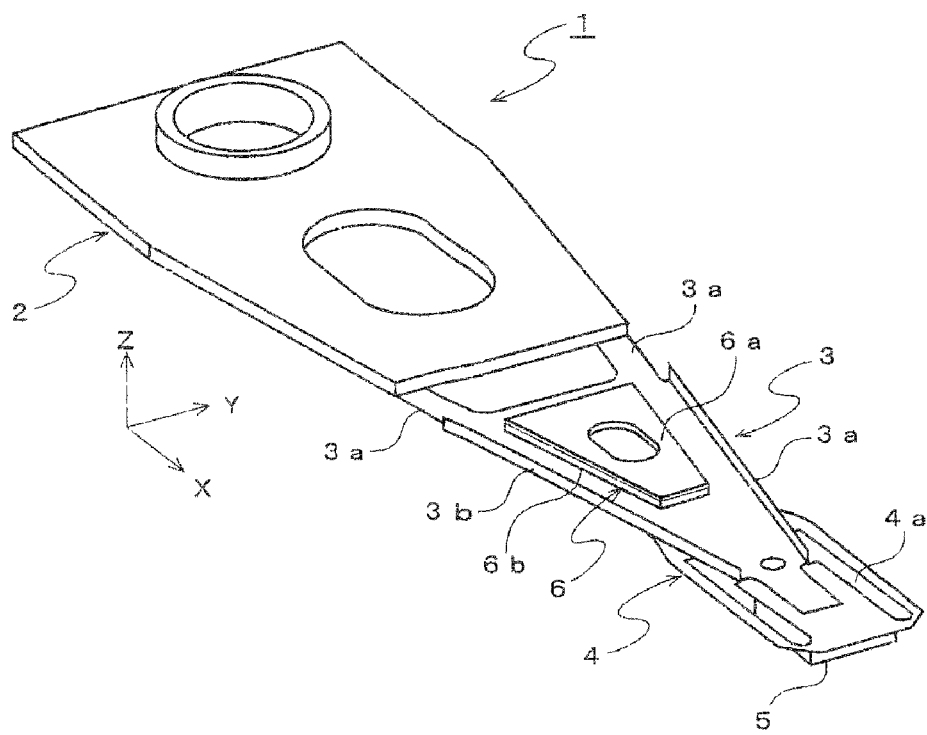
FIG. 15 is a perspective view of a head suspension, showing an example of a conventional head suspension mechanism having a restraining visco-elastic damping plate material.
Figure 16:
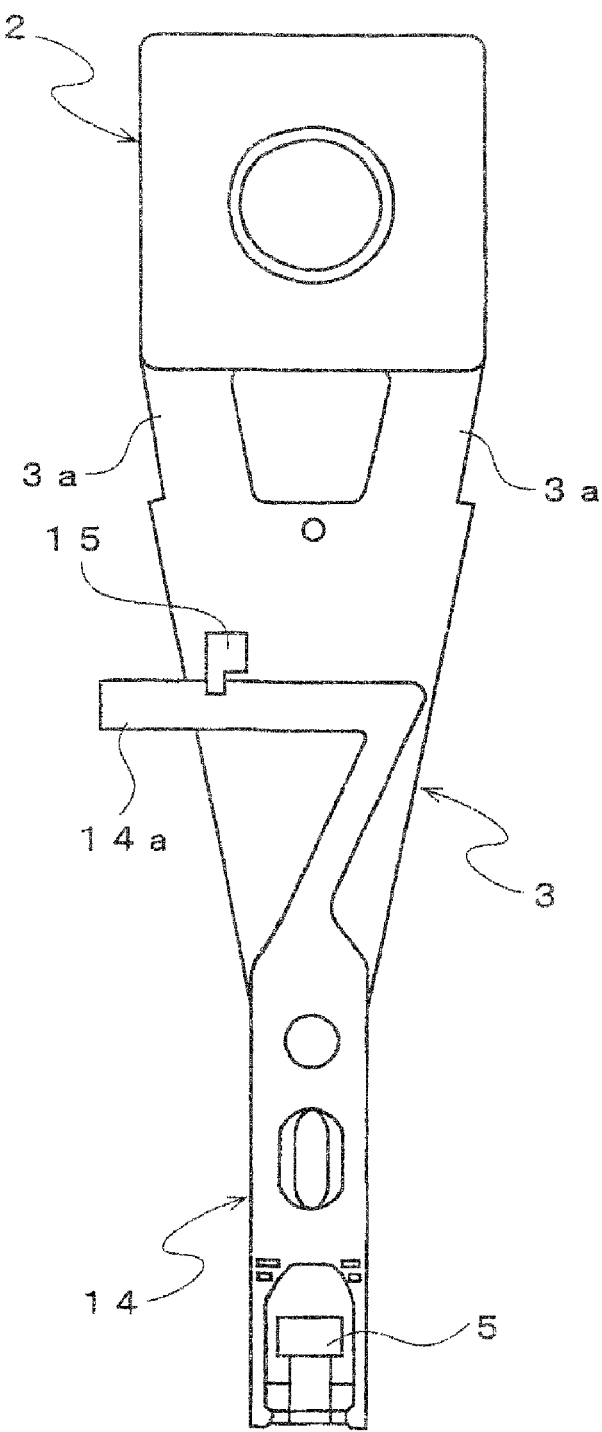
FIG. 16 is a perspective view of a head suspension, showing an example of a conventional head suspension mechanism having a dynamic vibration absorber.

The effects of the present invention have been explained regarding the head suspension mechanism having no restraining multilayer visco-elastic material, as shown in FIG. 2. However, the present invention can additionally be applied to the head suspension mechanism with the restraining multilayer visco-elastic material, which is now being used, shown in FIG. 3. FIG. 11 shows another embodiment in which the free end portion 43c and the dual tongue-shaped elastic plate 43d are applied to the head suspension mechanism with the restraining multilayer visco-elastic material shown in FIG. 6. In the embodiment shown in FIG. 11, there is provided a damping plate 45 to restrain the sway mode and second-order torsion mode vibrations that are not enough restrained by the restraining multilayer visco-elastic material only.

FIG. 11 shows an embodiment in which the restraining multilayer visco-elastic material is affixed to the embodiment of the present invention shown in FIG. 6. However, the restraining multilayer visco-elastic material can be affixed to the head suspension mechanism with the L-shaped dynamic vibration absorber for damping the sway mode vibrations in accordance with the present invention, which is shown in FIG. 1. Also, it is apparent that the restraining multilayer visco-elastic material can be affixed to the head suspension mechanism with the dual tongue-shaped elastic plate shaped dynamic vibration absorber for damping the second-order torsion mode vibrations, which is shown in FIG. 6.

In the above-described embodiments, there has been disclosed the head suspension mechanism having the flange portion 23b extending substantially over the whole length of the suspension main frame 23. However, the flange portion 23b is not necessarily needed, and a flange portion may be provided only a portion where the free end portion 23c shown in FIG. 1(C) is substantially provided.

As described above, the suspension main frame 23, 33, 43 in accordance with the present invention is provided with at least either one of the L-shaped dynamic vibration absorber and the dual tongue-shaped elastic plate shaped dynamic vibration absorber. Thereupon, the head suspension mechanism can damp the sway mode and second-order torsion mode vibrations that have not been enough damped conventionally by the restraining multilayer visco-elastic material. Therefore, the head suspension mechanism achieves an effect of restraining the sway mode vibrations resulting in a track shift caused by an air flow. Also, the L-shaped dynamic vibration absorber (the free end portion 23c, 43c) and the dual tongue-shaped elastic plate 33c, 43d in accordance with the present invention have a characteristic of being capable of being formed integrally of the same metal sheet as the suspension main frames 23, 33, 43. Therefore, a head suspension mechanism that can be manufactured at a low cost and is not subjected to wind disturbance vibrations can be provided.

What is claimed is:

1. A head suspension mechanism which supports a head slider rigidly in an in-plane direction and softly in an out-of-plane direction, comprising:
    a suspension main frame (23) having an elastic cantilever thin sheet extending horizontally to provide a load force to the head slider;
    a support portion (4) at a terminal end of the suspension main frame (23) to support the head slider;
    a connecting portion at each of the two opposite edges of the suspension main frame (23) at the tip end portion, extending vertically from the opposite edges; and
    a free end portion (23c) connected to each of the connecting portions, each free end portion extending from an upper end of the connecting portion in a horizontal direction opposite the tip end portion to form an L-shape with a space between a lower edge of the free end portion and an edge surface of the suspension main frame (23),
    wherein damping material is provided on each free end portion, a dampening effect of the damping material and the length of the flange portion forming a sway mode dynamic vibration absorber.

* * * * *